United States Patent [19]

Tieckelmann et al.

[11] Patent Number: 5,888,350

[45] Date of Patent: Mar. 30, 1999

[54] METHOD FOR REPULPING AND/OR DECOLORIZING BROKE USING PERSULFATE/METAL MIXTURES

[75] Inventors: Robert H. Tieckelmann, Trenton; Dean S. Thorp, Plainsboro, both of N.J.

[73] Assignee: FMC Corporation, Philadelphia, Pa.

[21] Appl. No.: 949,805

[22] Filed: Oct. 14, 1997

Related U.S. Application Data

[63] Continuation of Ser. No. 762,233, Dec. 10, 1996, abandoned, which is a continuation of Ser. No. 281,375, Jul. 27, 1994, abandoned, which is a continuation-in-part of Ser. No. 108,202, Aug. 17, 1993, abandoned.

[51] Int. Cl.[6] .............................. D21F 1/66; D21C 5/02
[52] U.S. Cl. ........................ 162/191; 162/78; 162/189
[58] Field of Search ................................ 162/4, 5, 6, 7, 162/8, 70, 72, 78, 79, 191, 189

[56] References Cited

U.S. PATENT DOCUMENTS

| | | | |
|---|---|---|---|
| 1,840,413 | 1/1932 | Schmidt | 162/79 |
| 2,477,631 | 8/1949 | Levy et al. | 8/105 |
| 2,872,313 | 2/1959 | House et al. | 92/1.4 |
| 2,886,412 | 5/1959 | Lake et al. | 23/114 |
| 3,048,546 | 8/1962 | Lake et al. | 252/95 |
| 3,049,495 | 8/1962 | Jenkins et al. | 252/102 |
| 3,227,517 | 1/1966 | Leaver et al. | 23/50 |
| 3,640,885 | 2/1972 | Rhees | 252/156 |
| 3,736,224 | 5/1973 | Grayson et al. | 162/65 |
| 4,022,965 | 5/1977 | Goheen et al. | 536/56 |
| 4,105,827 | 8/1978 | Brichard et al. | 425/403 |
| 4,162,156 | 7/1979 | Wood et al. | 162/5 |
| 4,179,394 | 12/1979 | Dillenburg et al. | 252/186 |
| 4,233,171 | 11/1980 | McLaughlin | 252/99 |
| 4,243,480 | 1/1981 | Hernandez et al. | 162/141 |
| 4,313,932 | 2/1982 | Watts | 424/62 |
| 4,343,679 | 8/1982 | De Ceuster et al. | 162/4 |
| 4,346,027 | 8/1982 | Van Eenan | 524/377 |
| 4,381,969 | 5/1983 | De Ceuster et al. | 162/5 |
| 4,454,005 | 6/1984 | Stofko et al. | 162/12 |
| 4,466,861 | 8/1984 | Hultman et al. | 162/38 |
| 4,548,674 | 10/1985 | Hageman et al. | 162/5 |
| 4,699,623 | 10/1987 | Dubreux et al. | 8/11 |
| 4,756,800 | 7/1988 | Springer et al. | 162/64 |
| 4,773,966 | 9/1988 | Huynh | 162/78 |
| 4,973,641 | 11/1990 | Tsai et al. | 527/312 |
| 4,981,557 | 1/1991 | Bjorkquist | 162/168.2 |
| 5,067,966 | 11/1991 | Mager et al. | 8/405 |
| 5,120,397 | 6/1992 | Urushibata | 162/5 |
| 5,151,212 | 9/1992 | Bell et al. | 252/186.38 |
| 5,223,592 | 6/1993 | Hughes et al. | 526/240 |
| 5,229,447 | 7/1993 | Miyajima et al. | 524/377 |
| 5,232,604 | 8/1993 | Swallow et al. | 210/759 |
| 5,252,184 | 10/1993 | Tanaka et al. | 162/168.2 |
| 5,281,351 | 1/1994 | Romeo et al. | 252/99 |
| 5,447,602 | 9/1995 | Sajbel et al. | 162/6 |
| 5,674,358 | 10/1997 | Espy | 162/7 |
| 5,718,837 | 2/1998 | Caropreso et al. | 252/186.43 |

FOREIGN PATENT DOCUMENTS

0585955  3/1994  European Pat. Off. .

OTHER PUBLICATIONS

Espy H. H. "Chlorine Free Reagents . . . Wet–Strength Broke", 1990 Papermakers Conference, pp. 147–149.
Espy H. H. "Persulfates as Repulping Agent . . . Wet Strength Broke", Feb. 1993, vol. 76, No. 2, TAPPI, pp. 139–142.
Kapadia, Pankaj, "A Non–Chlorine Repulping Aide", 1992 Papermakers Conference, pp. 51–56.
H. H. Espy and G. W. Geist, TAPPI Proceedings, 1990 Papermakers Conference, pp. 147–149.
H. H. Espy and G. W. Geist, TAPPI Journal, 76(2), 139–142.
P. C. Kapdice, TAPPI Proceedings, 1992 Papermakers Conference, pp. 51–56.
D. A. House, Chem. Rev. 48, 185–203 (1962).
I. M. Kolthoff and I. K. Miller, J. Am. Chem. Soc., 23, 3065–(1951).
Ullmann's Encyclopedia of Industrial Chemistry, 5th ed., VCH, Weinheim, 1991, pp. 187–191.
H. J. Kauffmann, J. Am. Chem. Soc. 69, 899–903 (1947).
H. J. Kauffmann, J. Am. Chem. Soc. 73, 4311–4314 (1951).
"Kinetics and Mechanism of Oxidations by Peroxydisulfate", D.A. House, *Chemical Review*, Col. 48, pp. 185–203 (1962).

*Primary Examiner*—Stanley S. Silverman
*Assistant Examiner*—Dean T. Nguyen
*Attorney, Agent, or Firm*—Bruce M. Monroe; Anthony L. Cupoli; Patrick C. Baker

[57] ABSTRACT

Repulping and/or decolorizing formulations and mixtures which include a catalytic amount of a salt of a metal such as copper, iron, silver, or nickel; a persulfate; and from 0–10% saccharide. Formulations containing a carbonate, sesquicarbonate or bicarbonate for adjusting pH are preferred. A method of repulping and/or decolorizing broke, whether containing wet strength resin or not, using the formulations or mixtures of the ingredients in the formulations.

25 Claims, No Drawings

METHOD FOR REPULPING AND/OR DECOLORIZING BROKE USING PERSULFATE/METAL MIXTURES

This application is a continuation of U.S. patent application Ser. No. 08/762,233, filed Dec. 10, 1996, now abandoned, which is a continuation of U.S. patent application Ser. No. 08/281,375, filed Jul. 27, 1994, now abandoned, which is a continuation-in-part of U.S. patent application Ser. No. 08/108,202, filed Aug. 17, 1993, now abandoned.

FIELD OF THE INVENTION

The invention relates to paper reprocessing, and more particularly to the repulping and/or decolorizing of wet strength broke.

BACKGROUND OF THE INVENTION

Broke is waste or off-specification paper which is to be recycled. It is generally more desirable to recycle the broke by a process called repulping than it is to merely dispose of the broke as waste paper.

In the repulping process, the cellulose fibers which make up the broke are separated from the broke to make them usable for manufacturing paper. In the process, wet strength resin (such as a polyamide-epichlorhydrin resin) used to enhance the strength of the paper must be broken down since it binds the cellulose fibers together, forming a water impervious coating which impedes the repulping process goal of separating the cellulose fibers. Representative paper products containing wet strength resins are paper towels, tissues, and food wrappings. Typically, paper having wet strength resins will retain at least 15% of the paper's dry strength when wet. Paper without wet strength resin generally retains only 2–7% of its dry strength when wet.

Oxidation facilitates the break down of the wet strength resin to permit separation of the cellulose fibers. Traditionally, hypochlorite, particularly sodium hypochlorite, has been used by paper mills as the oxidizing agent, and has generally been used within a narrow, carefully maintained pH range and within a temperature range of from about 122° F. (50° C.) to 151° F. (66° C.). After broke has been successfully repulped, an agent is added to neutralize the remaining chlorine.

Environmental issues have been raised concerning the use of hypochlorite for repulping. These concerns range from the formation of suspected carcinogenic organic halides which are adsorbed by the pulp, to the problem of chloroform emission, and to the problem of adding toxic chlorinated hydrocarbons to the effluent stream. For these reasons, non-halogen containing compounds such as persulfates have been used to oxidize wet strength resin during the repulping process.

When recycling broke, sometimes the broke must be decolorized. This is achieved by decomposing the colorants used to color the broke. Colorants are chemicals that interact with light, causing the absorption of selective wavelengths in the visible spectrum (400 to 700 nm). Wave-lengths that are reflected (not absorbed) yield colors that are perceptible to the human eye. Colorants include both pigments and dyes and can be added during the paper making process to produce colored paper. Pigments are water insoluble compounds that are generally unbleachable. Dyes are water soluble, and are more commonly used than pigments to produce colored papers.

Dye molecules have two functional parts: the chromophore and the auxochrome. The chromophore is the portion that lends color to the dye. The auxochrome is the portion that anchors the dye to the cellulose fiber.

Chromophores are conjugated, that is, they contain a network of alternating single and double bonds. Light interacts with the conjugated network and is absorbed by electrons within the network. Wavelengths that are not absorbed by the network are reflected to produce the color in the fiber.

Conjugated networks vary in length, the length generally corresponding to a dye color. As the number of conjugated bonds in the network increases, the colors change from yellow to orange to red to violet to blue to brown to black and the networks become more susceptible to oxidation or free radical attack. Correspondingly, it can be difficult to decolorize yellow, orange, and red dyes due to their low degree of conjugation.

There are many different dye structures, but there are two main dye classes used by the paper industry: azo dyes and stilbene dyes. Stilbene dyes are less popular than azo dyes but are more stable to many oxidants, including chlorine.

An azo dye is a chemical compound containing at least one nitrogen-nitrogen double bond (azo functional group), which is subject to oxidative attack. A stilbene dye is an aromatic system containing a series of carbon—carbon double bonds which are more resistant to oxidative attack than are the nitrogen to nitrogen double bonds found in azo dyes.

To repulp and/or decolorize and effectively meet environmental requirements, it would be a breakthrough to find a suitable composition which would permit separation of the fiber without destruction of the cellulose, yet permit altering the chromphore to decolorize. Chlorine can repulp and/or decolorize but presents undesirable environmental problems. Persulfates can be used for repulping but are generally ineffective as decolorizing agents.

SUMMARY OF THE INVENTION

We have discovered that a soluble salt of copper, iron, silver, or nickel used in conjunction with a persulfate salt provides the breakthrough by enhancing the decolorizing and/or repulping of broke over a wide pH range whether or not used as a formulated product. Such a combination is especially useful in treating wet strength broke.

We have also discovered that a saccharide, such as a monosaccharide, polysaccharide, or cis-alpha-hydroxy saccharide used in conjunction with a soluble copper, iron, silver, or nickel salt, and with a persulfate salt further enhances the decolorizing and/or repulping of the broke over a wide pH range.

These ingredients, whether added separately to form a mixture in situ, or added as a formulation, can be used in a method for repulping and/or decolorizing broke, particularly wet strength broke.

DESCRIPTION OF THE PREFERRED EMBODIMENTS

Soluble copper, iron, silver or nickel salt activates persulfate to make it more reactive towards colorants, or wet strength resins, such as those used in paper manufacture, than persulfate alone. The use of a pH adjuster, such as an acid or a base with the metal salt and persulfate can further enhance the repulping and/or decolorizing efficacy of the persulfate by providing a pH within the range of from 2 to 11. Addition of a saccharide to the above mixture can sometimes further enhance decolorizing and/or repulping efficacy of the persulfate.

Persulfate can repulp broke, particularly in the presence of base, even in the absence of the metal salt. However, the above described salts enhance repulping and make decolorization possible. These salts are used at such low concentrations that their effect appears catalytic. Although it is not known whether or not true catalysis is occurring, for purposes of this description, the terms "catalyst" or "catalytic amount" will be used when referring to the salt concentration, since the amount of metal salt required for repulping and/or decolorization is extremely low.

The effect of these metal salts on repulping can be further enhanced by the presence of a saccharide, such as a polysaccharide or a mono-saccharide. The most preferred saccharides for either repulping or decolorizing are the cis-alpha-hydroxy saccharides such as ascorbic acid, D-mannitol, and D-sorbitol.

Preferred pH adjusters for repulping and/or decolorizing include, alone or in combination, one or more of the following: sodium carbonate, sodium bicarbonate, and sodium sesquicarbonate.

In this specification and in these claims:

a) The term "about" herein shall be inferred when ranges, dosages, weight percent or other numerical designations are described, unless otherwise specified.

b) The term "persulfate" includes any persulfate salt including sodium persulfate, potassium persulfate, and ammonium persulfate, unless otherwise specified. The term "persulfate" does not include peroxymonosulfate, characterized by the $SO_5$ counterion, as the active ion.

c) The terms "carbonate", "sesquicarbonate" and "bicarbonate" include alkali metal, alkaline earth metal and ammonium salts of carbonate, sesquicarbonate or bicarbonate.

d) The term "dry" indicates a composition or substance which does not feel moist to the touch. A dry composition can have water of hydration.

e) The term "owf" is a dosage term which means based on the dry weight of fiber.

f) The term "consistency" is the broke weight percent based on the weight of the water used for repulping.

g) The term "percent" is a weight percent, unless otherwise expressly specified.

h) The term "soluble" when used in reference to a salt, indicates a salt that based on its solubility product constant can provide 0.5 ppm or more of solubilizable metal ion in an aqueous medium.

i) The term "BT-100" signifies a formulation containing 75% sodium persulfate and 25% sodium carbonate.

j) The term "% owf" means the percent of decolorization and/or repulping treatment used based on the weight of broke fiber being treated. This term is equivalent to the term "percent furnish."

k) The term "pHi" means initial pH.

l) The term "pHf" means final pH.

The compositions of this invention enhance the repulping of wet strength broke and are particularly effective in decolorizing the dyes in such broke. In one aspect of this invention a persulfate, and one or more of a metal salt of copper, iron, silver or nickel can be used for repulping, for decolorizing, or for both. These components can be added separately to the broke or in combination as a formulation, with or without a pH adjuster.

Generally, the formulations of this invention contain from 51 to 94% persulfate; from 4 to 43% pH adjuster; from 0 to 10% cis-alpha-hydroxy saccharide; and a catalytic amount of the metal salt. More preferably, the formulation contains from 61 to 85% persulfate; from 14 to 39% base selected from the group consisting of carbonate, bicarbonate and sesquicarbonate; and from 0.05 to 3% metal salt. More preferably, the formulation contains from 70 to 80% persulfate; from 20 to 29% sesquicarbonate; and from 0.1 to 2% copper salt. More preferably, the formulation contains 1 to 6% cis-alpha-hydroxy saccharide, most preferably from 1 to 3% cis-alpha-hydroxy saccharide.

The precise amount of persulfate, saccharide, pH adjuster and metal salt required for an effective composition for repulping or decolorization will depend on use conditions such as pH, the type or quantity of oxidizable material, and temperature, and depending on those conditions can vary from the values given above.

Exemplary pH adjusters include bases and acids. Exemplary bases include one or more of the following: sodium carbonate, sodium bicarbonate, potassium carbonate, potassium bicarbonate, calcium carbonate, sodium sesquicarbonate, potassium sesquicarbonate, and the like; these are particularly useful in dry formulations, but may be added separately. Other bases such as sodium hydroxide can also be used, particularly where separate addition of the components of this invention is practiced.

Acids which may be used as pH adjusters include the mineral acids such as hydrochloric acid and sulfuric acid, organic acids such as acetic, or any of the other acids known to those of ordinary skill in the art.

The preferred saccharides include ascorbic acid, D-sorbitol, and D-mannitol. Other saccharides can be used as long as they have no greater tendency to reduce the catalyst than D-mannitol, preferably, D-sorbitol, more preferably, or ascorbic acid, most preferably.

The catalytic metal salts include those salts which are sufficiently soluble in water to provide 1 ppm of solubilized metal ion. Suitable metals include copper, iron, silver, and nickel. Representative counterions include sulfate, chloride, nitrate, and other counterions which permit a reasonable degree of water solubility. These metal salts can include ligands.

The compositions of this invention are used to repulp and/or decolorize broke. In the repulping process, water and broke are placed in a vessel, and agitated. Agitation consists in using a mixer/shearer such as is commonly used in the industry to mix the broke, water, and chemicals in the repulping operation, as well as to comminute the broke. The use of a mixer/shearer is equivalent to using a separate mixing and shearing device. The chemicals of this invention can be added prior to or during agitation.

Different types of site addition can be used. The components can be mixed on site in dry form and fed as a dry mixture. The components can be added simultaneously to the repulping mixture as a dry powder, a slurry, a solution, or in any other suitable manner. Generally, the components can be added in any order.

Moreover, the repulped broke may be introduced directly into the paper making process as a slurry without further modification. Paper can be made from the repulped broke by separating the cellulose fibers from the slurry and introducing the fibers to a fourdrinier upon which paper is made.

The embodiments of this invention work best if the temperature of the system is greater than 50° C. A temperature within the range of 40° C. to 75° C. is generally sufficient to activate the persulfate and/or copper ion to support the oxidation of colorant or wet strength resin during repulping. Higher temperatures can be used, but generally are not required.

In the process, the resulting mixture is agitated for sufficient time to defiber the broke to produce a satisfactory pulp. The time can vary depending on factors such as concentration of the persulfate, base or acid, activator, consistency, amount of oxidizable material, pH, and temperature. The use of the persulfate/pH adjuster/metal salt with or without saccharide, whether or not formulated as a dry blend provides a significant time advantage over the use of persulfate alone or base alone.

Repulping time is dependent on the nature of the broke. Broke which contains a high percentage of wet strength resin requires a longer treatment time than broke which contains less wet strength resin.

The requirements for decolorization and for repulping need not be the same. However, repulping is generally completed before decolorization is completed.

Although a wide pH range is generally usable in the instant process, the repulp or decolorization time can be affected by the final system pH. Generally, a pH range of from 2 to 11 can be used for either repulping or for decolorization. However, a pH range of from 7 to 10 is preferred for repulping and/or for decolorizing. Most preferred is a pH that varies during the process, since different chromophores appear to be best oxidized at different pH.

In a preferred aspect of this invention a variable pH in the 7 to 8.5 range is achieved by employing a base such as an alkali metal, alkaline earth metal or ammonium salt of carbonate, sesquicarbonate, or bicarbonate as part of the decolorizing mixture or formulation to permit the pH to decrease as oxidation occurs. Addition of one of these bases separately or as part of the decolorizing formulation can provide an initial pH of 8.5 or higher. As decolorization progresses, acid products are formed which gradually lower the pH.

Other pH adjusters can be used. These include sodium hydroxide, sulfuric acid and other acids or bases known to those skilled in the art.

Final and initial pH compatible with process plant systems are preferred. It is desirable to select a pH range which optimizes the repulping process, the decolorization process or both. However, many times pH control is based on the desirability of obtaining a final pH for the system which is compatible with other stages of paper production. For example, when a satisfactory pulp is produced, the process water is typically mixed with processed pulp from other sources, which may be acid, neutral, or basic. Or water from other processes may be used as the makeup water for the broke repulping process.

Additional pH adjustment to accommodate these other stages is avoided by using the compositions of this invention as follows:

The ratio of persulfate to base can be selected to provide a neutral pH effect. That is, as the persulfate is consumed during the oxidation process, bisulfate is produced. A neutral pH effect is achieved by adjusting the amount of base used to offset the reduction in pH attendant acid production during repulping. Normally, the bisulfate produced from the persulfate is the only acid which need be considered. However, if large amounts of other acids are produced from decomposition of the fiber or the resin, those acids may have to be considered.

Alternatively, if the pH of one process, for example, the paper making process, differs from the pH of the repulping and/or decolorizing process, adjustments in pH can be made for the repulping and/or decolorizing process by varying the persulfate:(acid or base) ratio to avoid any need for subsequent pH adjustment. Thus, acid, neutral or alkaline paper making processes can be accommodated without requiring an additional pH adjustment step. It will be evident that such adjustments can be routinely achieved in light of the guidelines set forth herein. Consideration would be given to the actual pH and alkalinity of the system, to the acid expected to be generated and to the additional alkalinity provided by the addition of a formulated persulfate product, in view of standard chemical equations and calculations for the system.

In addition to pH, an effective dosage of the composition is desired. Dosages of 0.5% owf or greater are generally effective. The effective dosage is dependent upon system conditions, and can be determined using the information disclosed herein. A preferred dosage is 1% to 15% owf. A more preferred dosage is 2% to 12% owf. Higher or lower dosages than the ones specified herein can be effective depending on the change in system parameters.

The parameters indicated above are useful in repulping wet strength broke.

The following examples further illustrate the invention without limiting the scope thereof.

EXAMPLES

Determination of the Degree of Decolorization

In all of the decolorization examples herein, which provided the brightness, lightness, red/green(alpha), or yellow/blue(beta) readings for the paper being treated, an Elrepho Datacolor 2000 Reflectance meter at setting R-457 was used. All readings were taken from handsheets available before treatment or prepared from the treated broke. The reported results were an average of three readings.

Red/green and yellow/blue readings quantified the decolorization capability of each treatment with red and yellow having positive values and green and blue having negative values. For example, in the tables provided herein, a zero value in either column signifies complete decolorization. Thus, positive numbers signify predominance of red or yellow, while negative numbers signify the predominance of green or blue. Absolute values of 3 or less for either red/green or yellow/blue signify an acceptable degree of decolorzation for most paper making operations, as paper having these color values are perceived to be white when viewed by an unaided human eye. Higher absolute color values can be acceptable depending on the requirements of the end user.

Procedure for Repulping and/or for Decolorizing Wet Strength Broke

In the standardized process for repulping and or decolorization of wet strength and non-wet strength broke described below, unless otherwise indicated, oxidation of chromophores, or of the resin used in wet strength broke, or of other components of the broke was accomplished and measured by TAPPI (also known as The Technical Association of the Pulp and Paper Industry) method T-205-om81 for repulping wet strength broke, including any variances.

1500 mL of 70° C. (158° F.) water was poured into a 2 liter pyrex beaker. The pH was adjusted and the desired repulping composition added. The resulting slurry was then poured into a preheated disintegrator vessel which was adjusted to a maintenance temperature of 70° C. (158° F.). 20 grams of pre-cut 1 inch broke squares were then added, and the disintegrator was started with continuous sample mixing at 2800 rpm. Temperature readings and 10 mL aliquots were taken every 5 minutes. These 10 mL aliquots were diluted to 200 mL with tap water, and then compared with standard samples for stages 1 through 6 (described below). Sampling continued until a stage 6 sample was obtained; however, if a stage 6 sample was not obtained for repulping or if an absolute color value of 3 or less was not obtained for decolorization or if the required degree of decolorization was not obtained, then the, sampling ceased at the end of 60 minutes. The pH, temperature, and residual oxidizer and/or color measurements of the final sample were then recorded.

Generally, as paper was being repulped, if it was colored, it was also being decolorized. Similarly, if the paper was being decolorized it was also being repulped. The standards used for determining the efficacy of repulping were different from the standards used for determining the efficacy of decolorization. These are described herein.

Standard Samples for Repulp Stages 1–6

During the above described TAPPI repulping method the pulp characteristics changed from clumps of cut up resin coated paper in water to a relatively uniform mixture of free cellulose fiber and water (stage 6).

Repulp stages were determined by direct comparison to pre-made standards made according to the above TAPPI repulping method. These standards were characterized and designated as "stages", starting with stage 1 and ending with stage 6, as follows:

Stage 1 was characterized primarily as a broke having numerous large fiber flakes.

Stage 2 was characterized as a broke having large flakes, and small flakes.

Stage 3 was characterized as a broke having primarily numerous small fiber flakes.

Stage 4 was characterized as a broke having primarily few small flakes, and numerous bonded fibers.

Stage 5 was characterized as a broke which primarily has finely separated fibers and a few bonded fibers.

Stage 6 was characterized as a broke which has been repulped to finely separated fibers.

A fuller understanding of the above described repulping stages is provided by the following review of the process.

The initial broke could be cut up paper composed of 1 inch squares, or, it could be a roll of waste paper, which is comminuted by a blade, such as a high shear impeller, to a paper composed primarily of numerous large flakes. As the broke is repulped, it typically becomes increasingly smaller. Ideally, repulping produces a Stage 6 pulp composed of completely separated fiber. In practice, however, a Stage 5 product consisting primarily of separated fibers and a few bonded fibers is generally acceptable.

The paper produced from repulped broke is finer, the more complete the fiber separation in the pulp. Generally, the less completely separated the fiber, the greater degree of dumpiness and surface irregularity in the finished paper good.

Example 1 pH of 1% Solutions of Formulated Broke Treatment

The pH of a 1% solution of a formulated product containing 75% sodium persulfate and 25% sodium carbonate was determined as described in Table 1 below.

In the test procedure, one gram samples of formulated product were added to 99 grams of the water being evaluated. After 5 minutes mixing, the pH of the system was measured. The results are provided below and summarized in Table 1.

TABLE 1

| | pH of 1% Aqueous Solutions | | | |
|---|---|---|---|---|
| EX | (1) $pH_i$ | (2) $pH_f$ | (3) $pH_i$ | (4) $pH_f$ |
| 75% Sodium Persulfate/25% Sodium Sesquicarbonate | | | | |
| 1 | 5.07 | 10.22 | 7.49 | 10.03 |
| 2 | 4.50 | 10.26 | 7.23 | 10.02 |
| 75% Sodium Persulfate/25% Sodium Carbonate | | | | |
| 1 | 5.27 | 11.46 | 6.99 | 11.08 |
| 2 | 4.50 | 10.26 | 7.01 | 11.10 |

(1) pH of deionized water prior to addition of persulfate formulations. The subscript "i" signifies an initial pH.
(2) pH of deionized water five minutes after addition of formulations. The subscript "f" signifies a final pH
(3) pH of tap water prior to addition of persulfate formulations. Alkalinity of tap water = 80 ppm; total hardness = 110 ppm. The subscript "i" signifies an initial pH.
(4) pH of tap water five minutes after addition of formulations. The subscript "f" signifies a final pH.

Table 1 above demonstrates that pH increases rapidly when persulfate formulated at 75% persulfate and 25% base is added to an aqueous solution. In Table 1, the pH increase occurred in less than 5 minutes.

Example 2

Effect of Formulated Sodium Persulfate on PH Before and After Repulping Wet Strength Broke Repulping experiments were conducted in tap water. In these experiments the repulping formulation was added to a repulping mixture prepared according to the TAPPI method described above. The repulping formulations were dry blends of 75% sodium persulfate ("SP") and 25% of either sodium sesquicarbonate or sodium carbonate as indicated in Table 2 below.

TABLE 2

| | SP/Sodium Sesquicarbonate | | | SP/Sodium Carbonate | | |
|---|---|---|---|---|---|---|
| Formulation | (2) | (3) | | | | |
| (% OWF)(1) | $pH_i$ | $pH_a$ | (4)$pH_f$ | (2)$pH_i$ | (3)$pH_a$ | (4)$pH_f$ |
| 0.50 | 7.4 | 7.9 | 7.7 | 7.4 | 8.5 | 8.0 |
| 1.00 | 7.5 | 8.4 | 7.2 | 7.4 | 8.8 | 7.4 |
| 1.50 | 7.6 | 8.5 | 7.3 | 7.4 | 9.1 | 7.5 |
| 2.00 | 7.8 | 8.6 | 7.3 | 7.6 | 9.2 | 7.4 |
| 2.50 | 7.6 | 8.9 | 7.4 | 7.4 | 9.3 | 7.7 |

(1) % OWF = Addition of the formulated material based on the weight of the broke fiber.
(2) pHi = initial pH of tap water
(3) pHa = pH of the tap water after addition of treatment.
(4) pHf = Final pH of the wet strength broke solution after repulping was completed.

The experiments depicted in Table 2 show that a 75% persulfate, 25% base repulping formulation was self neutralizing for the tap water used. In the absence of sodium carbonate, sodium sesquicarbonate, sodium bicarbonate, or other base the acid bisulfate produced when the persulfate oxidizes the wet strength resin would be expected to decrease the pH to less than 7.

Example 3

Decolorization with Various Copper Salts

In this example, the efficacy of several sources of copper which included cuprous as well as cupric salts were examined. A rose-colored tissue paper containing wet strength resin was used. Formulations were prepared and mixed on a rollermill for one hour (hereinafter termed the "rollermill procedure") and then used in the standard repulping procedure described herein. The formulations were applied at 5% owf. The results are reported in Table 3.

TABLE 3

Decolorization with Various Copper Salts

| Treatment | Brightness | Lightness | (+/−) Red/Green | (+/−) Yellow/Blue |
|---|---|---|---|---|
| 5% BT-100 CuO[1] | 51.68 | 78.08 | 13.3 | 2.0 |
| 5% BT-100 $Cu_2O$[2] | 51.60 | 78.12 | 13.1 | 2.2 |
| 5% BT-100 $CuCl$[3] | 53.73 | 79.87 | 9.9 | 3.2 |
| 5% BT-100 $CuSO_4$[4] | 52.08 | 78.82 | 10.7 | 2.9 |
| 5% BT-100 $CuCl$[5] | 57.05 | 81.90 | 7.1 | 3.4 |
| 5% BT-100 $CuSO_4$[6] | 59.47 | 83.71 | 5.3 | 4.3 |

1. Cu added at 0.5 ppm from cupric oxide.
2. Cu added at 0.5 ppm from cuprous oxide.
3. Cu added at 0.5 ppm from cuprous chloride.
4. Cu added at 0.5 ppm from cupric sulfate pentahydrate
5. Cu added at 1.0 ppm from cuprous chloride.
6. Cu added at 1.0 ppm from cupric sulfate pentahydrate Table 3 illustrates the effectiveness of various copper compounds under alkaline conditions at decolorizing a rose-colored tissue paper. Because the paper was rose-colored, the reduction in red color was the most significant. The insoluble copper oxides were not very effective as decolorizers. The more soluble copper chloride and copper sulfate were more effective than the less soluble copper salts, even at less than 1 ppm. Copper sulfate at 1 ppm was the most effective copper salt tested in this example, producing the lowest red value.

Example 4

Experimental Decolorization Formulations I

The eight formulations described in Table 4 were prepared and evaluated for their ability to decolorize rose-colored, wet strength paper. Ascorbic acid (AscOH)/iron salt, or AscOH/copper salt were added to alkaline or neutral sodium persulfate mixtures using the following procedure: To a 250 mL Erlenmeyer flask 200mL tap water was added and heated to 70° C. in a microwave oven. Then a 2 g sample of the rose-colored tissue paper was added to each flask. A one gram portion of each formulation was then added to each of eight flasks. A 1.0 g of a formulation containing only 75% persulfate and 25% carbonate was added to a ninth flask. Observations were recorded over a two hour time span.

The formulations used are described in Table 4 below.

TABLE 4

Experimental Decolorization Formulations I

| Formulation | Chemical Addition | % w/w |
|---|---|---|
| 1 | 75% persulfate/25% carbonate[1] | 97.44 |
| | Ascorbic acid | 2.42 |
| | $(NH_4)_2Fe(SO_4)_2.6H_2O$ | 0.14 |

TABLE 4-continued

Experimental Decolorization Formulations I

| Formulation | Chemical Addition | % w/w |
|---|---|---|
| 2 | 75% persulfate/25% carbonate[1] | 97.44 |
| | Ascorbic Acid | 2.42 |
| | $CuSO_4.5H_2O$ | 0.14 |
| 3 | 75% persulfate/25% carbonate[1] | 95.44 |
| | Ascorbic Acid | 4.28 |
| | $(NH_4)_2Fe(SO_4)_2.6H_2O$ | 0.28 |
| 4 | 75% persulfate/25% carbonate[1] | 95.44 |
| | Ascorbic Acid | 4.28 |
| | $CuSO_4.5H_2O$ | 0.28 |
| 5 | 75% persulfate/25% carbonate[1] | 97.44 |
| | Ascorbic Acid | 2.42 |
| | $(NH_4)_2Fe(SO_4)_2.6H_2O$ | 0.14 |
| 6 | 75% persulfate/25% carbonate[1] | 97.44 |
| | Ascorbic Acid | 2.42 |
| | $CuSO_4.5H_2O$ | 0.14 |
| 7 | 75% persulfate/25% sulfate[2] | 95.58 |
| | Ascorbic Acid | 4.28 |
| | $(NH_4)_2Fe(SO_4)_2.6H_2O$ | 0.14 |
| 8 | 75% persulfate/25% sulfate[2] | 95.44 |
| | Ascorbic Acid | 4.28 |
| | $CuSO_4.5H_2O$ | 0.28 |
| 9 | 75% persulfate/25% sodium carbonate | 100 |

1 = 75% sodium persulfate/25% sodium carbonate.
2 = 75% sodium persulfate/25% sodium sulfate.

In Table 4 above, Formulations 1 and 2, containing 75% persulfate/25% carbonate/Ascorbic acid/metal salt worked best causing rapid decolorization. Formulation 4 containing an increased level of copper salt was next best. Formulations 3 and 5–8 exhibiting 40–70% color reduction was next best. Formulation 9 containing just 75% persulfate/25% carbonate was least effective.

The 75% persulfate/25% carbonate formulations were better than the formulations containing 75% persulfate/25% sulfate. It is believed that the improvement was primarily due to the higher pH (9–10) afforded by the carbonate as compared to the lower pH afforded by the sulfate.

For the 75% persulfate/25% carbonate formulations small amounts of copper worked well, and generally the smaller amount of copper salt provided better results. Copper salts were superior to the iron salts because residual iron imparted a slight yellow-brown color to the pulp, but both salts enhanced the decolorization of the paper.

Example 5

Experimental Decolorization Formulations II

In this example, 75% persulfate/25% carbonate with and without copper was evaluated for decolorizing six paper samples (Grey, Chartreuse, Cherry, Green, Ivory, and Blue) which did not contain wet strength resin using the following procedure:

Samples were cut into 1 inch squares. For each of the six sample colors, a 3.0 g sample paper was added to each of three separate erlenmeyer flasks which were placed in a row to provide six columns of flasks with a separate row for each of the six different colors. Chemicals were not added to the first flask in the row of broke samples. Each flask in the second row was treated with 0.50 g of a 75% persulfate/25% carbonate formulation. Row three samples were treated with a 0.50 g 75% persulfate/25% carbonate/ 0.01 g ascorbic acid (AscOH), and 0.001 g $CuSO_4$ formulation.

Each flask then received 100 mL of tap water preheated to 70° C. All flasks were gently swirled to mix chemicals.

Observations were recorded 16 hours after treatment. The experimental results obtained are presented in Table 5 below.

TABLE 5

Experimental Decolorization Formulations II
Observations After 16 Hours

| | Green | Ivory | Blue | Chtrs | Cherry | Grey |
|---|---|---|---|---|---|---|
| Row 1 (Untrt) | NR1 | NR | NR | NR | NR | NR |
| Row 2 (BT-100) | yellow[2] | lighter | white | yellow[2] | cherry[3] | orange[4] |
| Row 3 (BT-100/ AA/Cu) | yellow[5] | lighter | white | yellow | cherry[7] | brown[8] |

1. No reaction.
2. Formulation appeared to react with the blue dye component only.
3. Residual cherry color approximately 30% reduced.
4. Paper turned orange.
5. Same as 2 but lighter yellow shade.
6. Lighter yellow than chartreuse in row 2.
7. Color approximately 50% reduced.
8. Paper turned brown.

In Table 5 above the untreated, colored paper in the first row did not undergo a color change. The second row paper treated only with persulfate/carbonates showed some decolorization: the blue dyes were completely eliminated, the green paper turned to yellow, and other colors were slightly faded. The third row formulation, persulfate/ascorbic acid/copper, exhibited improved decolorization: blue dyes were eliminated, green paper turned yellow, and other colors were markedly reduced.

It is noteworthy that the blue dye which was completely eliminated by 75% persulfate/25% carbonate alone, was a copper-based dye. Thus, even though copper was not added, the in situ copper provided by the dye played an important role in the decolorization process. The copper/AscOH enhanced persulfate/carbonate was effective toward a wider range of dyes than persulfate/carbonate alone.

Example 6

Experimental Decolorization Formulations III

This example illustrated the decolorization efficacy of a 75% persulfate/25% carbonate/copper/saccharide formulation using cis-hydroxy saccharides including D-sorbitol, L-sorbose, D-ribose, D-mannitol, D-glucose, and D-galactose.

The standard rollermill and repulping procedures were used. A rose-colored tissue paper containing wet strength resin was treated at an application rate of 5% owf with a formulation containing 97.99% of BT-100, 2.00% saccharide, and 0.01% iron sulfate. The results are illustrated in Table 6 below.

TABLE 6

Experimental Dechlorization Formulations III
Evaluation of Saccharide Decolorization Activators

| Treatment[1] | Brightness | Lightness | (+/-) Red/Green | (+/-) Yellow/Blue |
|---|---|---|---|---|
| Control A[2] | 43.48 | 73.10 | 16.9 | 1.5 |
| Control B[3] | 53.24 | 79.44 | 11.3 | 2.6 |
| D-sorbitol | 60.28 | 83.72 | 5.1 | 3.6 |
| L-sorbose | 52.27 | 78.31 | 13.5 | 1.8 |
| D-ribose | 50.45 | 77.16 | 14.7 | 1.7 |
| D-mannitol | 53.60 | 80.44 | 8.9 | 4.3 |
| D-glucose | 50.75 | 77.98 | 12.7 | 2.8 |
| D-galactose | 51.07 | 77.73 | 13.2 | 1.9 |

1. Each saccharide formulation contained 97.99% of (BT-100), 2.00% saccharide and 0.01% $FeSO_4$.
2. No formulation used. Repulped with caustic addition to pH 10.
3. Repulped with 75% persulfate/25% carbonate alone. There was no saccharide or metal addition.

Table 6 illustrates that persulfate/carbonate alone effectively improved ISO brightness (53.24 vs 43.48) and lightness (79.44 vs 73.10) compared to pH 10 treatment. The paper was also less red, but yellowness increased slightly. Improvements in each category were afforded by supplemental treatments with D-sorbitol/Cu and D-mannitol/Cu. For each a combination of high brightness and lightness as well as low red/green and yellow/blue values were noted. The reduction in red value of this rose-colored paper was readily apparent. D-sorbitol provided the best reduction (5.1) with D-mannitol being next best (8.9).

Example 7

Repulping of Rose-Colored Paper

Example 7 illustrates the repulping of a rose-colored, wet strength paper and compares the effectiveness of sodium persulfate and a carbonate with (treatment B) and without (treatment A) copper.

The rollermill and repulping procedures described above were employed, and the results described in Table 7. The first tap water of the day containing 1 ppm Cu was used where the water source "tap" is indicated in Table 7. The deionized water contained no copper. As Table 7 illustrates, copper enhances the repulping efficacy of alkaline sodium persulfate. This is evidenced by the approximately 40% reduction in repulp time afforded by 1 ppm copper.

TABLE 7

Repulping of Rose-Colored Paper

| Treatment | Furnish (%) | Water Source | Time to Achieve Stage 6 (min) | Copper (ppm) |
|---|---|---|---|---|
| A | 5 | Deionized | 35 | 0 |
| A | 5 | Tap | 20 | 1 |
| B | 5 | Deionized | 25 | 0 |
| B | 5 | Tap | 15 | 1 |

A = 75% sodium persulfate/25% calcium carbonate (BT-100)
B = 75% sodium persulfate/24.5% sesquicarbonate/0.5% copper sulfate pentahydrate

Example 8

Effect of Copper Content of Dye on Decolorizing Efficacy I

Example 8 illustrates the decolorization of a wet strength tissue paper, which was dyed blue with a copper containing dye. The rollermill and repulping procedures described above were employed, and the results described in Table 8. A 15 minute repulping time was employed.

TABLE 8

Decolorizing Efficacy
Blue Facial Tissue

| Treatment | Furnish | ISO Brightness | Lightness | (+/−) Red/Green | (+/−) Yellow/Blue |
|---|---|---|---|---|---|
| Blue Facial | 0 | 72.59 | 83.27 | −7.2 | −8.4 |
| A | 5% | 79.86 | 90.73 | −1.3 | −1.0 |
| B | 5% | 83.68 | 94.02 | −0.6 | 1.8 |
| C | 5% | 86.51 | 95.20 | −0.7 | 1.5 |

A = 75% sodium persulfate/25% sodium carbonate
B = 75% sodium persulfate/24.5% sesquicarbonate/0.5% copper sulfate pentahydrate
C = Oxone ® peroxygen; Oxone, a trademark of duPont Inc. for 2 $KHSO_5 \cdot K_2SO_4 \cdot KHSO_4$, which has the active ingredient potassium caroate, a peroxymonosulfate.

As illustrated in Table 8, each of the three formulations tested worked well in decolorizing this copper containing dye. In each case the yellow/blue value was less than 3 indicating that the residual dye was not visible to the eye.

Example 9

Effect of Copper Content of Dye on Decolorizing Efficacy II

Example 9 illustrates the decolorization of wet strength paper colored with a copper containing green dye. The rollermill and repulping procedures described above were employed, and the results described in Table 9. A 15 minute repulping time was employed.

TABLE 9

Decolorizing Efficacy
Green Toilet Tissue

| Treatment | Furnish | ISO Brightness | Lightness | (+/−) Red/Green | (+/−) Yellow/Blue |
|---|---|---|---|---|---|
| Green Tissue | 0 | 63.61 | 86.71 | −17.4 | 5.0 |
| A | 5% | 85.13 | 95.29 | −1.8 | 2.9 |
| B | 5% | 85.86 | 95.83 | −1.2 | 3.4 |
| C | 5% | 83.92 | 95.05 | 1.1 | 3.2 |

A = 75% sodium persulfate/25% sodium carbonate
B = 75% sodium persulfate/24.5% sesquicarbonate/0.5% copper sulfate pentahydrate
C = Oxone ® peroxygen The data provided in Tables 8 and 9 illustrates that the addition of copper ion effectively enhances the decolorization performance of persulfates.

Example 10

Effect of Copper Content of Dye on Decolorizing Efficacy III

Example 10 illustrates the decolorization of a rose-colored, wet strength paper, which did not employ a copper containing dye. The rollermill and repulping procedures described above were employed, and the results described in Table 10. A 15 minute repulping time was employed.

TABLE 10

Decolorizing Efficacy
Rose Toilet Tissue

| Treatment | Furnish | ISO Brightness | Lightness | (+/−) Red/Green | (+/−) Yellow/Blue |
|---|---|---|---|---|---|
| Rose Tissue | 0 | 61.43 | 82.13 | 22.8 | −0.5 |
| A | 5% | 74.08 | 92.06 | 4.1 | 6.2 |
| B | 5% | 83.53 | 94.87 | 1.6 | 3.3 |
| C | 5% | 83.57 | 94.67 | 1.8 | 2.2 |

A = 75% sodium persulfate/25% sodium carbonate
B = 75% sodium persulfate/24.5% sesquicarbonate/0.5% copper sulfate pentahydrate
C = Oxone ® peroxygen In Table 10 enhanced decolorization for a mixture of persulfate and base in the presence of copper is illustrated.

Example 11

Effect of Copper Content of Dye on Decolorizing Efficacy IV

Example 11 illustrates the decolorization of a yellow colored, wet strength tissue paper, which did not employ a copper containing dye. The rollermill and repulping procedures described above were employed, and the results described in Table 11. A 15 minute repulping time was employed.

TABLE 11

Decolorizing Efficacy
Yellow Toilet Tissue

| Treatment | Furnish | ISO Brightness | Lightness | (+/−) Red/Green | (+/−) Yellow/Blue |
|---|---|---|---|---|---|
| Yellow Tissue | 0 | 56.44 | 95.38 | −2.6 | 26.4 |
| A | 5% | 73.84 | 95.55 | −0.9 | 11.5 |
| B | 5% | 85.23 | 96.15 | −0.2 | 4.1 |
| C | 5% | 85.68 | 96.31 | 0 | 4.2 |

A = 75% sodium persulfate/25% sodium carbonate
B = 75% sodium persulfate/24.5% sesquicarbonate/0.5% copper sulfate pentahydrate
C = Oxone Table 11 illustrates that copper was required for effective decolorization of the yellow dye used in this example.

Example 12

Effect of pH on Decolorizing Efficacy

Example 12 illustrates the decolorization of a rose-colored, wet strength paper, which did not employ a copper containing dye. The rollermill and repulping/decolorizing procedures described above were employed, and the results described in Table 12. A 15 minute decolorizing time was employed. The initial pH was recorded when the treatment "Control" or "B" was added to the system.

TABLE 12

Decolorizing Efficacy
Rose Paper

| Treatment | OWF (%) | pHi | ISO Brightness | Lightness | (+/−) Red/Green | (+/−) Yellow/Blue |
|---|---|---|---|---|---|---|
| Control | 0 | 10.0 | 43.48 | 73.10 | 16.9 | 1.5 |
| B | 5 | 2.1* | 61.16 | 85.63 | 5.2 | 6.8 |
| B | 5 | 4.0* | 58.60 | 85.12 | 5.7 | 7.3 |
| B | 5 | 7.1* | 65.99 | 88.06 | 3.2 | 5.8 |
| B | 5 | 8.3 | 60.17 | 83.74 | 5.0 | 3.8 |
| B | 5 | 10.5+ | 57.68 | 81.86 | 10.1 | 2.6 |

B = 75% sodium persulfate/24.5% sesquicarbonate/0.5% copper sulfate pentahydrate
*pH adjusted with sulfuric acid $H_2SO_4$
+ pH adjusted with sodium hydroxide, NaOH Table 12 illustrates the effectiveness of persulfate and copper as a decolorizer over a wide pH range, extending from about 2 to about 10.5, with the best decolorizing occurring within the range of about 2 to about 9.5.

Example 13

Effect of pH on Repulping Efficacy

Example 13 illustrates the repulping of a rose-colored, wet strength paper, which did not employ a copper containing dye. The rollermill and repulping procedures described above were employed, and the results described in Table 13.

TABLE 13

Repulping Efficacy
Rose Paper

| Treatment | OWF (%) | pHi | pHf | Time to achieve Stage 6 (min) |
|---|---|---|---|---|
| B | 5 | 2.1* | 2.2 | 35 |
| B | 5 | 4.0* | 2.6 | 30 |
| B | 5 | 7.1* | 3.7 | 20 |
| B | 5 | 8.3 | 6.4 | 15 |
| B | 5 | 10.5+ | 8.3 | 15 |

B = 75% sodium persulfate/24.5% sesquicarbonate/0.5% copper sulfate pentahydrate
*pH adjusted with sulfuric acid, $H_2SO_4$
+ pH adjusted with sodium hydroxide, NaOH Table 13 illustrates the effectiveness of persulfate and copper salt in repulping within a pH range of from 2.1 to 10.5. Repulping efficacy was good over the entire pH range tested; yet, it improved further as the pH increased from slightly acidic (>4) to basic. This study indicates that at a pHi >7 efficacy is further improved, and that greatest repulping efficacy occurs at a pHi >8.

Example 14

Effect of Temperature on Decolorizing Efficacy

Example 14 illustrates the decolorization of a rose-colored, wet strength paper, which did not employ a copper containing dye. The rollermill and repulping/decolorizing procedures described above were employed, and the results described in Table 14. A 15 minute repulping time was employed, and decolorization occurred at the indicated temperature.

TABLE 14

Decolorizing Efficacy
Rose Paper

| Treatment | OWF (%) | Temp (C.) | ISO Brightness | Lightness | (+/−) Red/Green | (+/−) Yellow/Blue |
|---|---|---|---|---|---|---|
| Control | 0 | 70 | 43.48 | 73.10 | 16.9 | 1.5 |
| A | 5 | 40 | 39.64 | 71.41 | 21.6 | 3.8 |
| B | 5 | 40 | 40.86 | 72.35 | 17.8 | 4.0 |
| A | 5 | 50 | 41.42 | 72.62 | 20.8 | 3.8 |
| B | 5 | 50 | 45.92 | 76.55 | 12.1 | 5.5 |
| A | 5 | 70 | 51.82 | 79.36 | 10.6 | 4.2 |
| B | 5 | 70 | 60.17 | 83.74 | 5.0 | 3.8 |

A = 75% sodium persulfate/25% sodium carbonate
B = 75% sodium persulfate/24.5% sesquicarbonate/0.5% copper sulfate pentahydrate Table 14 illustrates that decolorization begins to occur at about 50° C. or higher when a dyed paper was treated with sodium persulfate and copper sulfate. Without copper salt decolorization began to occur at 70° C., but not at a satisfactory level.

Example 15

Effect of Temperature on Repulping Efficacy

Example 15 illustrates the repulping of a rose-colored, wet strength paper, which did not employ a copper containing dye. The rollermill and repulping/decolorizing procedures described above were employed, and the results described in Table 15. Repulping occurred at the indicated temperature.

TABLE 15

Repulping Efficacy
Rose Paper

| Treatment | OWF (%) | pHi | Temperature (C.) | Time to achieve Stage 6 (min) |
|---|---|---|---|---|
| A | 5 | 8.6 | 40 | 60 |
| B | 5 | 8.5 | 40 | 50 |
| A | 5 | 8.9 | 50 | 60 |
| B | 5 | 8.0 | 50 | 30 |
| A | 5 | 8.4 | 70 | 20 |
| B | 5 | 8.3 | 70 | 15 |

A = 75% sodium persulfate/25% sodium carbonate
B = 75% sodium persulfate/24.5% sodium sesquicarbonate/0.5% copper sulfate pentahydrate Table 15 illustrates that repulping occurred at 40° C. with repulping efficacy improving as the temperature increased. Also, the presence of copper improved the repulping efficacy over what was attainable by repulping without copper.

Example 16

Effect of Alkalinity Source on Decolorizing Efficacy

Example 16 illustrates the decolorization of a rose-colored, wet strength paper napkin, which did not employ a copper containing dye. The rollermill and repulping/decolorizing procedures described above were employed, and the results described in Table 16. A 15 minute repulping time was employed, and decolorization occurred under the pH conditions indicated.

TABLE 16

Decolorizing Efficacy Rose Paper

| Treatment | Furnish (%) | pHi | ISO Brightness | Lightness | (+/−) Red/Green | (+/−) Yellow/Blue |
|---|---|---|---|---|---|---|
| Control | 0 | 10.0 | 43.48 | 73.10 | 16.9 | 1.5 |
| SP/Cu/NaOH | 5 | 9.0* | 65.60 | 88.05 | 3.3 | 6.1 |
| SP/Cu/Na$_2$SO$_4$ | 5 | 7.6+ | 55.04 | 84.21 | 4.5 | 9.5 |

Control = caustic solution without persulfate or copper
SP = Sodium persulfate, Cu = copper sulfate pentahydrate
* = NaOH added as alkali and to increase pH.
+ = Na$_2$SO$_4$ added as alkali and to increase pH.

Table 16 illustrates the efficacy of sodium persulfate with copper ion for reducing color using sodium hydroxide or sodium sulfate as the pH adjuster. Using sodium hydroxide as the base, there was a reduction of the red color to an acceptable value of 3.3. Similarly, using sodium sulfate as the base there was a marked reduction in the red value to 4.5; it is expected that the red value would decrease further with a small increase in processing time. The increase in yellow value may have been imparted by the high concentration of sulfate used when Na$_2$SO$_4$ was used to adjust the pH. Generally, it is believed that with sufficient contact time, the yellow values will decrease further. In some instances, however, it may be more expedient or necessary to select a different pH adjuster or to use less of a particular pH adjuster that may be causing a color problem in conjunction with more of another pH adjuster.

Example 17

Effect of Alkalinity Source on Repulping Efficacy

Example 17 illustrates the repulping of a rose-colored, wet strength paper, which did not employ a copper containing dye. The rollermill and repulping/decolorizing procedures described above were employed, and the results described in Table 17. A 15 minute repulping time was employed, and repulping occurred under the pH conditions indicated.

TABLE 17

Repulping Efficacy Rose Paper

| Treatment | Furnish (%) | pHi | pHf | Time to achieve Stage 6 (min) |
|---|---|---|---|---|
| B | 5 | 8.3 | 6.4 | 15 |
| 75%SP/ 0.5%CuI 24.5%NaOH | 5 | 9.0* | 3.71 | 25 |
| 75%SP/ 0.5%Cu/ 24.5%Na$_2$SO$_4$ | 5 | 7.6+ | 4.52 | 25 |

B = 75% sodium persulfate/24.5% sesquicarbonate/0.5% copper sulfate pentahydrate
SP = Sodium persulfate, Cu = copper sulfate pentahydrate
* = NaOH added as alkali and to increase pH.
+ = Na2SO$_4$ added as alkali and to increase pH.
pH$_i$ = initial pH
pH$_f$ = final pH Table 17 illustrates that the sesquicarbonate which produces an initial pH of 8.3 is the best alkalinity source for minimizing repulping time; however, each of the treatments tested at each pH employed produced good results.

Example 18

Repulping Toweling Grades with Copper Activated Persulfate

Example 18 illustrates the repulping of a variety of grades of toweling, using sodium persulfate with copper and a base such as sodium carbonate or sodium sesquicarbonate. The rollermill and repulping/decolorizing procedure described above were employed, and the results are presented in Table 18.

TABLE 18

Repulping Toweling Grades with Copper Activated Persulfate

| Treatment | Furnish (%) | Broke Type | Time to Achieve Stage 6 (min) | Copper |
|---|---|---|---|---|
| A | 5 | Plain Towel | 40 | No |
| B | 5 | Plain Towel | 20 | Yes |
| A | 5 | Printed Towel | 50 | No |
| B | 5 | Printed Towel | 20 | Yes |
| A | 5 | Yellow Towel | 30 | No |
| B | 5 | Yellow Towel | 20 | Yes |

A = 75% sodium persulfate/25% sodium carbonate
B = 75% sodium persulfate/24.5% sesquicarbonate/0.5% copper sulfate pentahydrate Tables 7 and 18 above illustrate the enhanced repulping effect provided by copper in the repulping formulation, with the time for repulping being reduced on the average by about 50% as evidenced by the reported times for achieving stage 6.

Example 19

Repulping Comparison: Persulfate/Copper and Peroxymonosulfate

Example 19 illustrates the repulping of various, wet strength papers, and compares the efficacy of a caroate containing formulation to an embodiment of this invention. The rollermill and repulping procedures described above were employed, and the results described in Table 19.

TABLE 19

Repulping Comparison: Persulfate/Copper and Peroxymonosulfate

| Treatment | OWF (%) | Broke Type | Time to Achieve Stage 6 (min) | Copper |
|---|---|---|---|---|
| B | 5 | Plain Towel | 20 | Yes |
| C | 5 | Plain Towel | 20 | No |
| B | 5 | Printed Towel | 20 | Yes |
| C | 5 | Printed Towel | 30 | No |
| B | 5 | Yellow Towel | 20 | Yes |
| C | 5 | Yellow Towel | 30 | No |

B = 75% sodium persulfate/24.5% sodium sesquicarbonate/0.5% copper sulfate pentahydrate
C = Oxone ® peroxygen As illustrated in Table 19, copper when used with sodium persulfate and sodium carbonate provides an enhanced repulping time relative to a caroate-based peroxygen.

Example 20

Decolorization with Sorbitol/Cu and Ascorbic Acid/Cu

This example illustrates the decolorization efficacy of various formulations on a rose-colored paper. Hypochlorite was used as a standard, as it has been, and is, the industry standard. Oxone was used because it has been commercially used for both decolorization and repulping. The rollermill and repulping procedures described above were used. Formulations were applied at 5% owf. Ascorbic acid, like D-sorbitol has a cis-hydroxyl group.

The results of this study are provided in Table 20 below.

TABLE 20

Decolorization with Sorbitol/Cu and Ascorbic Acid/Cu

| Treatment | Brightness | Lightness | (+/−) Red/Green | (+/−) Yellow/Blue |
|---|---|---|---|---|
| Control | 43.48 | 73.10 | 16.9 | 1.5 |
| 2% BT-100 | 48.84 | 76.49 | 14.5 | 2.4 |
| 4% BT-100 | 52.06 | 79.42 | 10.7 | 4.0 |
| 6% BT-100 | 53.21 | 80.53 | 10.4 | 4.7 |
| 5% BT-100 + Cu[1]/Asc[2] | 60.26 | 84.90 | 3.5 | 5.2 |
| 5% BT-100 + Cu[1]/Sor[3] | 69.76 | 88.52 | 2.8 | 3.4 |
| Oxone 5% | 67.20 | 84.13 | 9.7 | −2.6 |
| OCl⁻ 2% | 79.87 | 93.55 | 1.7 | 3.7 |

*The Control is caustic solution pHi 10 only.
1. Cu added at 1 ppm from $CuSO_4 \cdot 5H_2O$
2. Asc = ascorbic acid.
3. Sor = D-sorbitol.

A mixture of 75% sodium persulfate and 25% sodium carbonate at 6% OWF effectively improved ISO brightness (53.21 vs 43.48) and lightness (80.53 vs 73.10) compared to the pH 10 treatment. The paper was also less red, but yellowness increased slightly.

The persulfate/carbonate formulation was somewhat effective at increasing levels. A significant improvement in decolorization was achieved when either ascorbic acid/copper or D-sorbitol/copper was added with persulfate and carbonate. Either treatment yielded a pulp that was better than the Oxone treatment for reducing the red value associated with rose-colored paper napkin. However, hypochlorite (OCl⁻) was slightly better than any of the non-chlorine treatments for red color reduction.

In this study, enhanced persulfate systems were more effective than peroxymonosulfate, but not as effective as the hypochlorite.

Example 21

Decolorization with Saccharide/Copper Mixtures

Example 21 illustrates the decolorization efficacy of three enhanced persulfate/carbonate uses with D-sorbitol/Cu, D-mannitol/Cu, or copper. A broke derived from a wet strength resin containing rose-colored paper was used as the paper sample. The repulping and rollermill procedures described herein were used. The results are illustrated in Table 21 and the formulations are presented in Table 21A.

TABLE 21

Decolorization with Saccharide/Copper Mixtures

| Treatment | Brightness | Lightness | (+/−) Red/Green | (+/−) Yellow/Blue |
|---|---|---|---|---|
| Form. 1 | 52.87 | 78.75 | 11.3 | 2.2 |
| Form. 2 | 60.17 | 83.74 | 5.0 | 3.8 |

TABLE 21-continued

Decolorization with Saccharide/Copper Mixtures

| Treatment | Brightness | Lightness | (+/−) Red/Green | (+/−) Yellow/Blue |
|---|---|---|---|---|
| Form. 3 | 58.82 | 83.37 | 5.4 | 4.5 |
| Form. 4 | 64.12 | 85.08 | 4.7 | 2.6 |

TABLE 21A

Formulations

| Formulation | Chemical Composition | % w/w |
|---|---|---|
| 1 | BT-100 | 100 |
| 2 | BT-100 | 99.50 |
|   | $CuSO_4 \cdot 5H_2O$ | 0.50 |
| 3 | BT-100 | 97.50 |
|   | D-sorbitol | 2.00 |
|   | $CuSO_4 \cdot 5H_2O$ | 0.50 |
| 4 | BT-100 | 47.50 |
|   | D-mannitol | 2.00 |
|   | $CuSO_4 \cdot 5H_2O$ | 0.50 |

In Table 21, the two copper enhanced formulations were essentially equal in reducing the red value associated with the rose-colored paper napkin. All other values (brightness, lightness, red/green, and yellow/blue) were also essentially equal. Both were markedly superior to formulation 1, which did not contain copper.

We claim as follows:

1. A method for decolorizing colorant containing broke, the method comprising agitating an aqueous slurry at a temperature of at least 50° C. for a time sufficient to decolorize the broke, the aqueous slurry comprising the colorant containing broke and at least 0.5 weight percent, based on the dry weight of fiber in the broke, of a formulation comprising the following components:

(A) 51 to 94% of a persulfate;
   (B) 4 to 43% of a pH adjuster; and
   (C) 0.05 to 6% of a soluble catalyst, said catalyst selected from the group consisting of soluble salts of copper, soluble salts of iron, soluble salts of silver, soluble salts of nickel, and mixtures of said salts; and
   (D) 0 to 10% of a saccharide that has no greater ability to reduce the catalyst than does D-mannitol.

2. The method of claim 1 in which the components of the formulation are added as a dry formulation.

3. The method of claim 1 in which the components of the formulation are added separately.

4. The method of claim 1 in which the aqueous slurry comprises from 1 to 15% weight percent of the formulation, based on the dry weight of fiber in the broke.

5. The method of claim 4 in which:
   the formulation comprises 62 to 85% the persulfate, 14 to 39% of the pH adjuster, and 0.05 to 3% of the catalyst; and
   the pH adjuster is selected from the group consisting of carbonate, bicarbonate, and sesquicarbonate.

6. The method of claim 5 in which the pH of the aqueous slurry is in the range of 7 to 10.

7. The method of claim 6 in which:
   the formulation comprises 70 to 80% the persulfate, 20 to 29% of the pH adjuster, and 0.1 to 2% of the catalyst;
   the catalyst is a copper salt; and the pH adjuster is a sesquicarbonate.

8. The method of claim 7 in which the pH adjuster is sodium sesquicarbonate.

9. The method of claim 5 in which:
the aqueous slurry is heated to a temperature of at least 60° C.; and
the aqueous slurry is maintained a temperature of 60° C. or greater for a time period sufficient to decolorize the broke.

10. The method of claim 4 in which the formulation comprises 1 to 6% of the saccharide and the saccharide is a cis-α-hydroxy saccharide.

11. The method of claim 10 in which:
the formulation comprises 62 to 85% of the persulfate, 14 to 39% of the pH adjuster, 0.05 to 3% of the catalyst, and 1 to 3% of the saccharide; and
the pH adjuster is selected from the group consisting of carbonate, bicarbonate, and sesquicarbonate.

12. The method of claim 11 in which the saccharide is selected from the group consisting of ascorbic acid, D-mannitol, and D-sorbitol.

13. The method of claim 11 in which:
the formulation comprises 70 to 80% the persulfate, 20 to 29% of the pH adjuster, and 0.1 to 2% of the catalyst;
the catalyst is a copper salt; and
the pH adjuster is a sesquicarbonate.

14. The method of claim 13 in which the pH adjuster is sodium sesquicarbonate.

15. A method for repulping broke comprising agitating an aqueous slurry at a temperature of 50° C. or greater until at least a stage 5 pulp is obtained, the aqueous slurry comprising broke and at least 0.5 weight percent, based on the dry weight of fiber in the broke, of a formulation comprising the following components:
(A) 51 to 94% of a persulfate;
(B) 4 to 43% of a pH adjuster;
(C) 0.05 to 6% of a soluble catalyst, said catalyst selected from the group consisting of soluble salts of copper, soluble salts of iron, soluble salts of silver, soluble salts of nickel, and mixtures of said salts; and
(D) 0 to 10% of a saccharide that has no greater ability to reduce the catalyst than does D-mannitol.

16. The method of claim 15 in which the components of the formulation are added as a dry formulation.

17. The method of claim 15 in which the components of the formulation are added separately.

18. The method of claim 17 in which:
the formulation comprises 70 to 80% of the persulfate, 20 to 29% of the pH adjuster, and 0.1 to 2% of the catalyst;
the pH adjuster is a sesquicarbonate; and
the catalyst is a copper salt.

19. The method of claim 15 in which the formulation comprises 1 to 6% of the saccharide and the saccharide is a cis-α-hydroxy saccharide.

20. The method of claim 19 in which:
the formulation comprises 70 to 80% of the persulfate, 20 to 29% of the pH adjuster, and 0.1 to 2% of the catalyst;
the pH adjuster is a sesquicarbonate;
the catalyst is a copper salt; and
the saccharide is selected from the group consisting of ascorbic acid, D-mannitol, and D-sorbitol.

21. A method for decolorizing wet strength broke comprising agitating an aqueous slurry at least 60° C. and at a pH of 2 to 11 until at least a stage 5 pulp is obtained and the broke has been decolorized, the aqueous slurry comprising a colorant containing wet strength broke and at least 0.5 weight percent, based on the dry weight of fiber in the broke, of a formulation comprising the following components:
(A) 51 to 94% of a persulfate;
(B) 4 to 43% of a pH adjuster; and
(C) 0.05 to 6% of a soluble catalyst, said catalyst selected from the group consisting of soluble salts of copper, soluble salts of iron, soluble salts of silver, soluble salts of nickel, and mixtures of said salts.

22. The method of claim 21 in which the components of the formulation are added as a dry formulation.

23. The method of claim 21 in which the components of the formulation are added separately.

24. The method of claim 21 in which:
the formulation comprises 70 to 80% of the persulfate, 20 to 29% of the pH adjuster, and 0.1 to 2% of the catalyst;
the pH adjuster is a sesquicarbonate; and
the catalyst is a copper salt.

25. The method of claim 21 in which the pH of the aqueous slurry is in the range of 7 to 10.

* * * * *